(12) United States Patent
Lee (10) Patent No.: US 9,409,056 B2
(45) Date of Patent: Aug. 9, 2016

(54) GOGGLES COMPRISING ADJUSTABLE NOSE BRIDGE

(71) Applicant: Bom Kyu Lee, Seoul (KR)

(72) Inventor: Bom Kyu Lee, Seoul (KR)

( * ) Notice: Subject to any disclaimer, the term of this patent is extended or adjusted under 35 U.S.C. 154(b) by 0 days.

(21) Appl. No.: 14/374,921

(22) PCT Filed: Mar. 5, 2013

(86) PCT No.: PCT/KR2013/001752
§ 371 (c)(1),
(2) Date: Jul. 28, 2014

(87) PCT Pub. No.: WO2013/133600
PCT Pub. Date: Sep. 12, 2013

(65) Prior Publication Data
US 2015/0000017 A1    Jan. 1, 2015

(30) Foreign Application Priority Data

Mar. 7, 2012  (KR) .................. 10-2012-0023099
Mar. 4, 2013  (KR) .................. 10-2013-0022943

(51) Int. Cl.
*A63B 33/00* (2006.01)
*G02C 5/04* (2006.01)
(Continued)

(52) U.S. Cl.
CPC .............. *A63B 33/002* (2013.01); *A63B 33/00* (2013.01); *G02C 5/122* (2013.01); *A63B 2033/004* (2013.01); *A63B 2033/006* (2013.01); *G02C 2200/18* (2013.01)

(58) Field of Classification Search
CPC ........... A63B 33/002; A63B 2033/004; A63B 2033/006; A61F 9/027; Y10T 24/4019; Y10T 24/4084; Y10T 24/3423; Y10T 24/2192; Y10T 24/3409; Y10T 24/40; Y10T 24/4016; Y10T 24/4072; Y10T 24/4077; Y10T 24/04; A43C 11/12; A43C 11/14; A44B 11/223; A44B 11/14; A44B 11/2592; B63C 11/12; B63C 2011/128; G02C 2200/04; G02C 2200/18; G02C 3/02; G02C 5/122; G02C 5/126

See application file for complete search history.

(56) References Cited

U.S. PATENT DOCUMENTS 1,374,896 A * 4/1921 Arnold .............................. 2/450
1,807,681 A * 6/1931 Baker ............................... 2/437
(Continued)

FOREIGN PATENT DOCUMENTS

JP       03-060225        5/1999
KR    20-1998-0000875    3/1998
(Continued)

OTHER PUBLICATIONS

International Search Report Dated Jun. 19, 2013 From the Korean Intellectual Property Office Re. Application No. PCT/KR2013/001752 and Its Translation Into English.

*Primary Examiner* — Bobby Muromoto, Jr.
(74) *Attorney, Agent, or Firm* — STIP Law Group, LLC (57) ABSTRACT

Goggles in which the space between a pair of eyecups is adjusted by a nose bridge are provided. The goggles include: a nose bridge for connecting the facing ends of the eyecups, and a band holder, extended from at least one of the facing ends of the eyecups, for accommodating and fixing one end of the nose bridge. The nose bridge includes a plurality of hooking parts longitudinally arranged. The band holder includes a through hole, which is formed at a free end, through which one end of the nose bridge passes, a first fixing pin, placed at the through hole, to be hooked to the hooking parts, and a pair of second fixing pins, placed at the through hole, to be hooked to the transverse edge of the nose bridge.

10 Claims, 11 Drawing Sheets

(51) Int. Cl.
*G02C 5/12* (2006.01)
*A63B 71/10* (2006.01)

(56) References Cited

U.S. PATENT DOCUMENTS

| | | | | |
|---|---|---|---|---|
| 4,051,557 | A * | 10/1977 | Bengtson et al. | 2/430 |
| 4,279,039 | A * | 7/1981 | Drew | 2/428 |
| 4,286,340 | A * | 9/1981 | Lathrop | 2/430 |
| 4,348,775 | A * | 9/1982 | Haslbeck | 2/452 |
| 4,527,292 | A * | 7/1985 | Kasama et al. | 2/452 |
| 4,607,398 | A * | 8/1986 | Faulconer | 2/452 |
| 5,546,611 | A * | 8/1996 | Lathrop | 2/428 |
| 5,727,259 | A * | 3/1998 | Kawamata | 2/452 |
| 6,349,421 | B2 * | 2/2002 | Fukasawa et al. | 2/428 |
| 6,446,272 | B1 * | 9/2002 | Lee | 2/428 |
| 6,859,947 | B2 * | 3/2005 | Lee | 2/428 |
| 6,883,184 | B2 * | 4/2005 | Lee | 2/446 |
| 7,966,701 | B2 * | 6/2011 | Shiue | 24/170 |
| 2003/0106139 | A1 * | 6/2003 | Lee | 2/426 |
| 2003/0182718 | A1 * | 10/2003 | Lee | 2/452 |
| 2007/0263168 | A1 * | 11/2007 | Cohen et al. | 351/135 |
| 2012/0102631 | A1 * | 5/2012 | Lee | 2/431 |

FOREIGN PATENT DOCUMENTS

| | | |
|---|---|---|
| KR | 20-0227552 | 6/2001 |
| KR | 10-2011-0003259 | 1/2011 |
| WO | 2011-002194 A2 | 1/2011 |
| WO | WO 2013/133600 | 9/2013 |

* cited by examiner

GOGGLES COMPRISING ADJUSTABLE NOSE BRIDGE

RELATED APPLICATIONS

This application is a National Phase of PCT Patent Application No. PCT/KR2013/001752 having International filing date of Mar. 5, 2013, which claims the benefit of priority of Korean Patent Application Nos. 10-2012-0023099 filed on Mar. 7, 2012 and 10-2013-0022943 filed on Mar. 4, 2013. The contents of the above applications are all incorporated by reference as if fully set forth herein in their entirety.

TECHNICAL FIELD

The present invention relate to goggles including a pair of eye-cups. More particularly, the present invention relates to goggles having an adjustable distance between a pair of eyecups.

BACKGROUND ART

Goggles are attached to a user's head to cover and protect wear's eyes. An example of the goggles, there are swimming goggles in which opposite ends of a pair of eyecups disposed on user's left and right eyes are connected with each other by a nose bridge (bridge band).

As swimming goggles in the related art, there are swimming goggles in which a support hole provided at an inner end of the eyecup is inserted with the nose bridge. In the swimming goggles, since the support hole is inserted with the nose bridge at one site, a distance between the eyecups may be controlled.

As another example of the swimming goggle in the related art, there is a swimming goggle in which the support hole provided at the eyecup and the nose bridge are coupled with each other at several sites and thus the distance between the eyecups is controlled. For example, in International Application Laid-Open WO 01/80956 A1, swimming goggles in which a distance between eyecups is adjusted through a nose bridge are disclosed. In swimming goggles in the related art disclosed in WO 01/80956 A1, a hook member provided at the eyecup is inserted with one of a plurality of through holes provided in the nose bridge to connect the eyecup and the nose bridge. Further, the hook member of the eyecup is inserted with an inner or outer through hole of the plurality of through holes to adjust the distance between the eyecups.

DETAILED DESCRIPTION OF THE INVENTION

Technical Problem

In the swimming goggles in the related art in which the hooking part provided at the eyecup is inserted to the plurality of through holes provided in the nose bridge, as the hooking part of the eyecup is inserted to the inner through hole, one end of the nose bridge protrudes to the lower side of the hooking part to contact a user's face or the tip of nose. Accordingly, the protruding end of the nose bridge may give displeasure or discomfort to the user. Particularly, when the swimming goggles is suddenly taken off or impact or force is applied to the swimming goggles from the front side, one end of the nose bridge passes the user's face or the tip of nose, thereby damaging the user's face.

Further, in the aforementioned swimming goggles in the related art, in order to adjust the distance between the eyecups, the hooking part of the eyecup needs to be again inserted from one through hole to the other through hole of the through holes of the nose bridge. In order to release the engagement between the nose bridge and the hooking part, the nose bridge needs to be extended so that the hooking part is deviated from the through hole. Accordingly, the user needs to pull the nose bridge by strong force with respect to the eyecup for the extension of the nose bridge to give discomfort on a use to the user.

The present invention has been made in an effort provide goggles in which one end of a nose bridge does not protrude toward a user's face and a distance between the eyecups is adjusted by the nose bridge.

Further, the present invention has been made in an effort provide goggles in which the eyecups and the nose bridge are simply and rapidly fixed at several sites.

Means for Solving the Problem

An exemplary embodiment of the present invention provides goggles including: a pair of eyecups having a lens part; a nose bridge connecting facing ends of the eyecups; and a band holder extended from at least one of the facing ends of the eyecups. The nose bridge may includes a plurality of hooking parts arrayed in a length direction in at least one end. The band holder may accommodate and fix one end of the nose bridge. The band holder may include a through hole formed at a free end and through which one end of the nose bridge passes, a first fixing pin positioned in the through hole and hooked to the hooking part of the nose bridge, and a pair of second fixing pins positioned in the through hole with the first fixing pin therebetween and hooked to a transverse edge of the nose bridge.

The first fixing pin may have a slope which is inclined in an inserting direction to the band holder of the nose bridge and a hook surface hooked to the hooking part at an opposite side of the slope. A front end of the first fixing pin and a rear end of the second fixing pin may be spaced apart from each other in the inserting direction and a perpendicular direction to the inserting direction. The second fixing pin may have a slope which is inclined at an obtuse angle in the inserting direction.

The hooking part of the nose bridge may include hook holes passing through the nose bridge. The hook hole may have a slope which is inclined in the inserting direction to the band holder of the nose bridge at a side contacting the first fixing pin and a hook surface hooked to the first fixing pin at an opposite side of the slope.

The hooking part of the nose bridge may include hook grooves. The hook groove may have a slope which is inclined in the inserting direction to the band holder of the nose bridge at a side contacting the first fixing pin and a hook surface hooked to the first fixing pin at an opposite side of the slope.

The band holder may have an inner wall and an outer wall which are extended from at least one of facing ends of the eyecups and face each other and a pair of side walls which is extended between the inner wall and the outer wall. The through holes may be formed in a free end of the inner wall and a free end of the outer wall. The first fixing pin may be positioned at the free end of one of the inner wall and the outer wall, and the second fixing pin may be positioned at the side wall.

Effect of the Invention

According to the embodiments, the nose bridge connecting the eyecups is rapidly and simply fixed to the band holder at several sites and thus the distance between the eyecups may be easily adjusted. Further, since the nose bridge is accommodated in the band holder and thus does not protrude toward a user's face, the nose bridge may not be damaged on the user's face.

MODE FOR CARRYING OUT THE INVENTION

Goggles according to an embodiment of the present invention will be described with reference to the accompanying drawings Like elements or components corresponding to the drawings designate like reference numerals.

Direction indication words such as "Front", "forward", and the like used in the specification mean a direction on which a user keeps an eye while wearing goggles and Direction indication words such as "rear", "backward", and the like used in the specification mean a direction opposite thereto. Further, direction indication words such as "inner", "inward", and the like used in the specification mean a direction toward the center of the goggles and direction indications such as "outer", "outward", and the like mean a direction opposite thereto.

Goggles according to an embodiment may be used as swimming goggles. An application example of the goggles according to the embodiment is not limited to the swimming goggles. The goggles according to the embodiment are attached to a user's head to cover or protect user's eyes.

The goggles according to the embodiment have a pair of eyecups which are positioned on user's left and right eyes, respectively. In the goggles according to the embodiment, the pair of eyecups are connected to each other through a nose bridge by fixing and accommodating a part of one end of the nose bridge to a band holder provided at facing ends of the eyecups, that is, internal ends of the eyecups. In the goggles according to the embodiment, the nose bridge is inserted into the band holder through an opening formed in the free end of the band holder or removed to the outside of the band holder. The band holder has a through hole through which a part of one end of the nose bridge passes in the free end, and a accommodating space in which the part of one end of the nose bridge is accommodated by passing through the through hole. As an embodiment, the band holder has a pair of facing inner wall and outer wall and a pair of side walls extended between the inner wall and the outer wall, and a space in which the inner wall, the outer wall, and the side wall are defined becomes the accommodating space. Further, the free ends of the inner wall and the outer wall become the free end of the band holder to define the through hole. Further, the free end of the side wall may define the through hole together with the free ends of the inner wall and the outer wall.

In the goggles according to the embodiment, a distance between the eyecups is adjusted by fixing the nose bridge and the band holder to each other at several sites. The fixing operation is achieved by hooking and engaging between a hooking part provided at the nose bridge and a fixing part provided at the band holder. In the goggles according to the embodiment, the hooking part of the nose bridge includes a plurality of hook holes which is arrayed in a longitudinal direction of the nose bridge and passes through the nose bridge, and a plurality of hook grooves which is arrayed in a longitudinal direction of the nose bridge and formed at the nose bridge with a predetermined depth. The fixing part of the band holder includes a first fixing pin hooked to the hooking part of the nose bridge and a pair of second fixing pins hooked to a width-directional edge of the nose bridge. The first fixing pin is positioned at the through hole, and the second fixing pin is positioned at the through hole with the first fixing pin therebetween. Further, a rear end of the second fixing pin is positioned outside of a front end of the first fixing pin.

In the goggles according to the embodiment, when the nose bridge is pressed or inserted into the band holder, while a transverse edge of the nose bridge is hooked to the second fixing pin, the hooking parts of the nose bridge climb over the first fixing pin in sequence, and thus while the nose bridge moves to the inside of the band holder, the distance between the eyecups is reduced. In order to smoothly press or insert the nose bridge, at least one or two of the hooking part of the nose bridge and the first fixing pin has a slope which is inclined at an acute angle in a pressing direction or inserting direction of the nose bridge.

In the goggles according to the embodiment, an increase of the distance between the eyecups is achieved by removing the nose bridge from the band holder and re-coupling the hooking part of the nose bridge and the first fixing pin. When the nose bridge is removed, after hooking between one edge and any one of the second fixing pins is released by twisting the nose bridge or the hooking between both edges and the second fixing pins is released, the nose bridge may be removed from the band holder.

Figure 1:
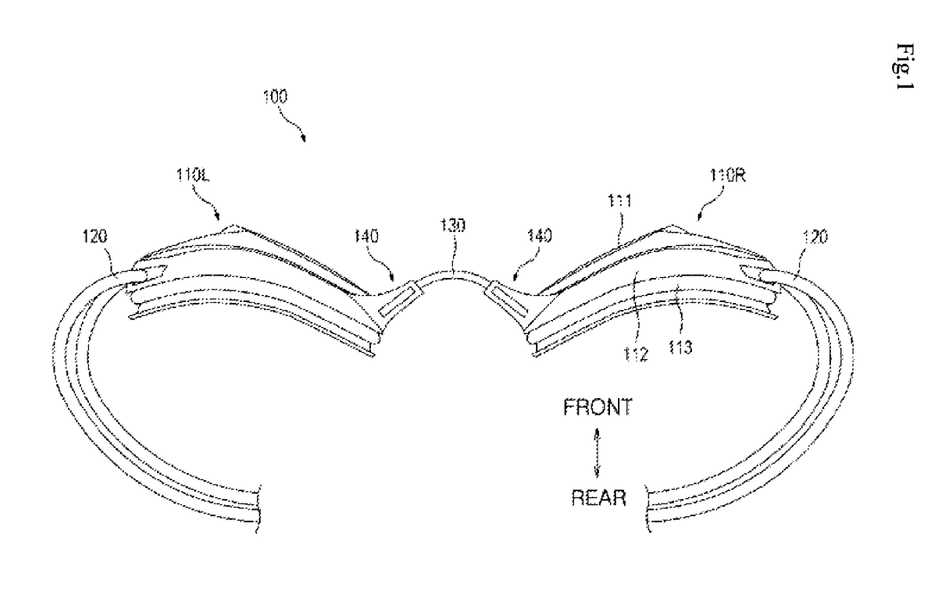
FIG. 1 is a front view illustrating goggles according to an embodiment of the present invention.

FIGS. 1 to 10 illustrate goggles 100 according to an embodiment of the present invention and components configuring the goggles 100. Referring to FIG. 1, the goggles 100 includes a pair of eyecups 110L and 110R, a head strap 120 connected to outer ends of the eyecups 110L and 110R, a nose bridge 130 coupled with facing inner ends of the eyecups 110L and 110R to connecting the eyecups 110L and 110R, and a band holder 140 disposed at the facing inner ends of the eyecups 110L and 110R and accommodating and fixing one end or a part of the one end of the nose bridge 130.

The eyecup 110L is positioned on the user's left eye, and the eyecup 110R is positioned on the user's right eye. The eyecups 110L and 110R have a symmetrical shape based on the center of the goggles 100, and are configured by the same element or component.

Figure 2:
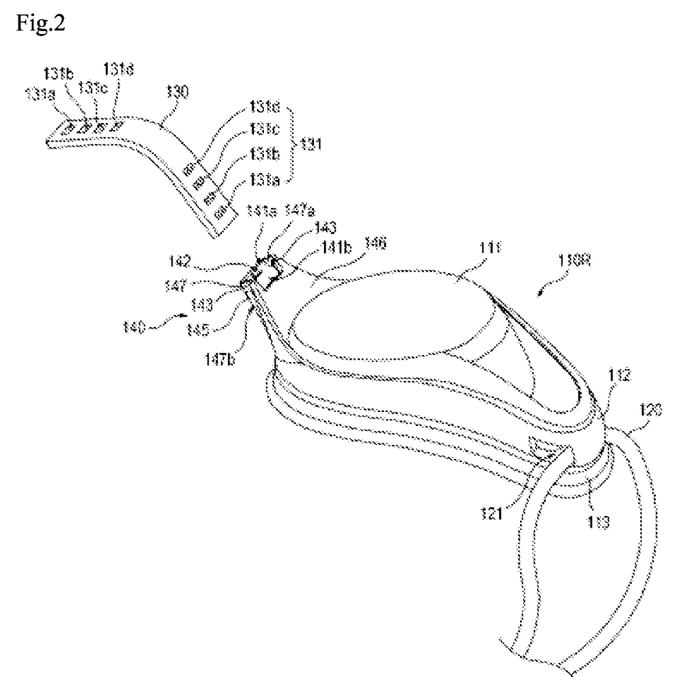
FIG. 2 is a perspective view showing a right eyecup and a nose bridge.
Figure 3:
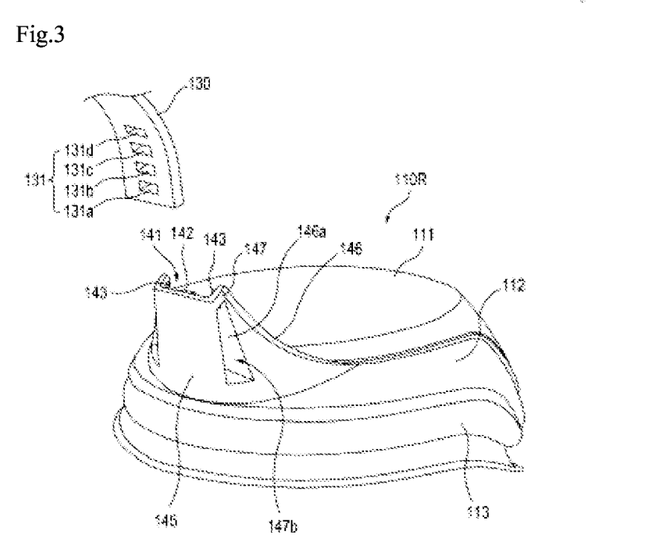
FIG. 3 is a perspective view illustrating the right eyecup and the nose bridge illustrated in FIG. 2 in another direction.
Figure 4:
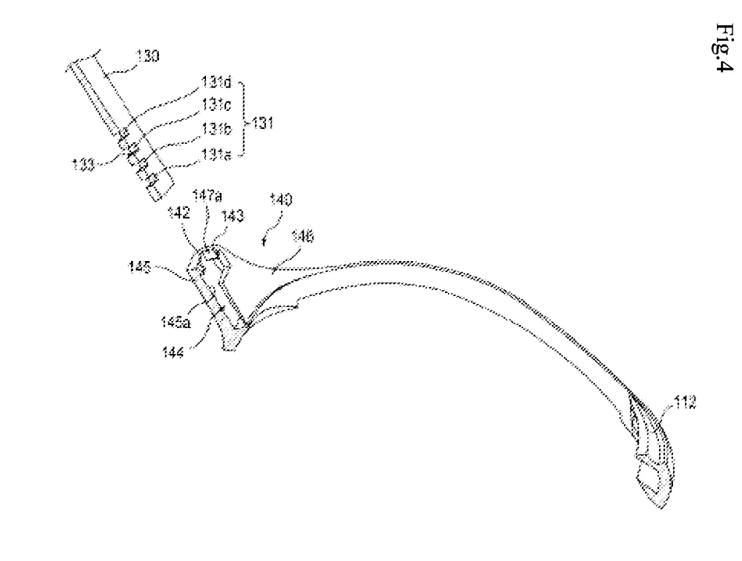
FIG. 4 is a perspective view illustrating a longitudinal section of a frame part, a band holder, and a nose bridge illustrated in FIG. 2.

Referring to FIGS. 2 and 3, each of the eyecups 110L and 110R has a lens part 111, a frame part 112, and a gasket 113. The lens part 111 has a circular or oval shape so as to correspond to an eye shape of the user. The frame part 112 is extended along a circumference of the lens part 111. The lens part 111 and the frame part 112 may be integrally formed, and may be separately manufactured to be integrally coupled with each other. The lens part 111 and the frame part 112 may be transparently formed by using plastic materials. Further, only the lens part may be transparently formed, and the frame part 112 may be translucently or opaquely formed. The gasket 113 is attached along a rear circumference of the frame part 112. The gasket 113 is made of rubber or an elastomeric material, and contacts the user's face around the eyes when wearing the goggles.

The head strap 120 is made of rubber, plastic, or an elastomeric material which is elastic or flexible. The head strap 120 may have a yarn shape, a band shape, or a combination thereof. The head strap 120 contacts the user's head when wearing the goggles to fix the goggles 100 to the user's head. The head strap 120 is connected to outer ends of the eyecups 110L and 110R, in detail, outer ends of the frame part 112. For this connection, the goggles 100 includes a head-strap connecting apparatus 121. In the embodiment, the head-strap connecting apparatus 121 includes through holes formed at the outer end of the frame part 112. In another embodiment, the head-strap connecting apparatus 121 is disposed near the outer end of the frame part 112 to be coupled with the head strap 120 at several sites.

The nose bridge 130 connects the eyecups 110L and 110R to each other. The nose bridge 130 may be made of hard or soft rubber, plastic, an elastomeric material.

The band holder 140 accommodates one end or a part of one end of the nose bridge 130. The band holders 140 are disposed at facing ends of the eyecups 110L and 110R, that is, internal ends of the eyecups 110L and 110R. In an embodiment, the band holders 140 are disposed at the internal end of the frame part 112 and integrally formed with the frame part 112. In another embodiment, the band holders 140 are manufactured by separate components to be attached or fastened to the frame part 112.

In the goggles 100, the distance between the eyecups 110L and 110R is adjusted by fixing the nose bridge 130 and the band holder 140 at several sites. The fixing operation is achieved by hooking and engaging between the hooking part provided at the nose bridge 130 and the fixing part provided at the band holder 140.

In the embodiment, the hooking part provided at the nose bridge 130 includes a plurality of hook holes 131 formed in the nose bridge 130. As illustrated in FIGS. 2 and 3, the hook holes 131 are penetrated in a thickness direction of the nose bridge 130 at predetermined intervals or equal intervals in a length direction of the nose bridge 130. In the embodiment, the nose bridge 130 has four hook holes 131a, 131b, 131c, and 131d at one end thereof, and the hook hole 131 has a substantially rectangular shape. In another embodiment, the hook hole may have square, circular, oval, and other shapes.

Referring to FIGS. 2 to 6, the band holder 140 will be described. The band holder 140 is extended obliquely forward from the inner end of the frame part 112 of the eyecups 110L and 110R. The band holder 140 has a shape in which the free end (the front end of the connecting holder) is narrow and the band holder is increased toward the rear end. The free end of the band holder 140 is opened, and the band holder 140 is integrally connected from the rear end (the fixed end of the band holder) to the inner end of the frame part 112.

The opened free end of the band holder 140 forms the through hole 141 through which one end or the part of one end of the nose bridge 130 passes. Further, the band holder 140 has a accommodating space 144 which passes through the through hole 141 and accommodates one end or the part of one end of the nose bridge 130. In the embodiment, the through hole 141 defined in the free end of the band holder 140 includes a first through hole 141a positioned in the free end of the band holder 140, and a second through hole 141b extended from the first through hole 141a and opened toward an outer side and a lower side (rear side) of the band holder 140 from the first through hole 141a. The nose bridge 130 is fixed to the band holder 140 at the first through hole 141a. The second through hole 141b provides a space in which a part of the nose bridge 130 may be bent or curved when the nose bridge 130 is inserted and a space in which the nose bridge 130 may be twisted when the nose bridge 130 is removed. In the embodiment, both the first through hole 141a and the second through hole 141b form an opening of the free end of the band holder 140. Widths (lengths in a perpendicular direction to the length direction of the nose bridge) of the first through hole 141a and the second through hole 141b correspond to the width of the nose bridge 130.

The band holder 140 has a first fixing pin 142 and a pair of second fixing pins 143 positioned with the first fixing pin 142 therebetween, as the aforementioned fixing part. During the fixing between the nose bridge 130 and the band holder 140, the first fixing pin 142 is hooked or inserted to the hook hole 131 of the nose bridge 130, and the second fixing pins 143 are hooked to the edge in the width direction of the nose bridge 130, thereby preventing the nose bridge 130 from the removed from the through hole 141.

The band holder 140 has an inner wall 145 and an outer wall 146 extended substantially in parallel, and a pair of side walls 147 extended between the inner wall 145 and the outer wall 146. The inner wall 145 has a substantially rectangular shape, and is extended obliquely forward from an inner end (the facing inner ends of the eyecups) of the frame part 112. The inner wall 145 faces a user's the tip of nose at the rear surface thereof. The outer wall 146 is decreased forward. The outer wall 146 is extended obliquely forward from an inner end (the facing inner ends of the eyecups) of the frame part 112. The distance between the pair of side walls 147 corresponds to the width of the nose bridge 130. When the nose bridge 130 is fixed to the band holder 140, the nose bridge 130 may contact a facing surface 147a of the side wall 147 at both edges in the width direction thereof. The front surface 145a of the inner wall 145, the rear surface 146a of the outer wall 146, and the facing surface 147a of the side wall 147 define the accommodating space 144. The accommodating space 144 has a size which may accommodate the width and the thickness of the nose bridge 130. The side wall 147 is extended between the inner wall 145 and the outer wall 146 near the free end of the band holder 140. Accordingly, a pair of side openings 147b is formed between the side wall 147 and the inner end of the frame part 112. Since one end of the nose bridge 130 is accommodated in the accommodating space 144, one end of the nose bridge 130 does not contact the user's face or the tip of nose. In the embodiment illustrated in FIGS. 2 and 6, the free end of the side wall 147 is positioned on the same plane as the free end of the inner wall 145. In other embodiment, the free end of the side wall 147 may be positioned at the inside with respect to the free end of the inner wall 145.

Figure 5:
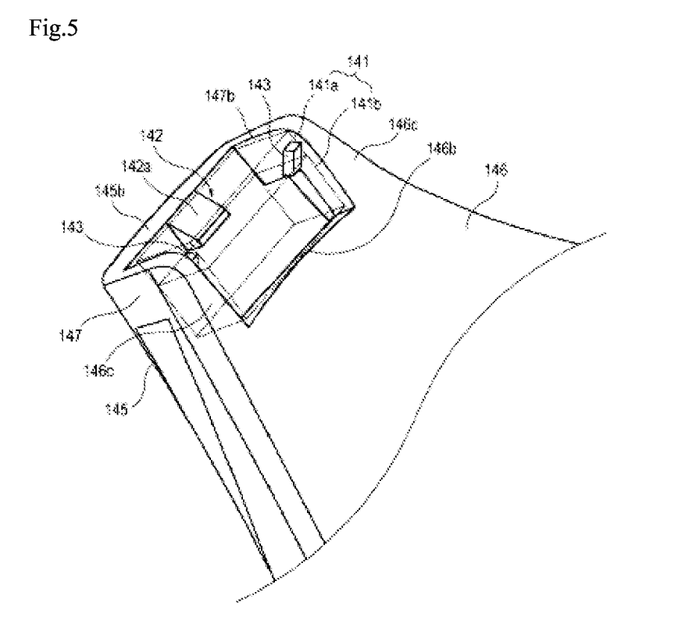
FIG. 5 is an enlarged perspective view illustrating a free end of the band holder illustrated in FIG. 2.
Figure 6:
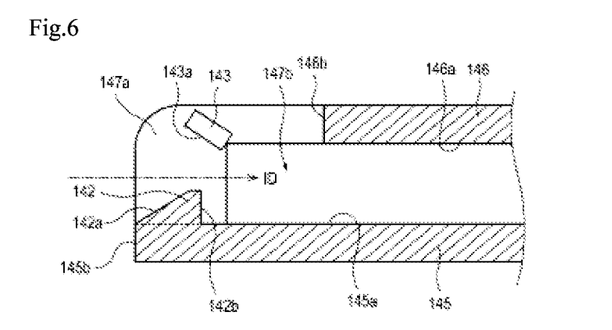
FIG. 6 is an enlarged vertical cross-sectional view illustrating the free end of the band holder illustrated in FIG. 2.

As illustrated in FIGS. 5 and 6, the first through hole 141a is defined between the free end 145b of the inner wall 145 and both side walls 147. The first fixing pin 142 is positioned in the first through hole 141a and protrudes from the front surface 145a of the inner wall 145. The second fixing pin 143 is positioned in the first through hole 141a or throughout the first through hole 141a and the second through hole 141b, and protrudes from the facing surface 147a of the side wall 147. The free end (front end) 146b of the outer wall 146 is positioned to be closer to the eyecup 110R than the free end 146b of the inner wall 145. The outer wall 146 has a pair of bridge parts 146c that connects the free end 146b and the free ends of both side walls 147. The bridge part 146c is connected to the free end of the side wall 147 at the inner end thereof. Further, the inner end of the bridge part 146c is rounded. The second through hole 141b is defined among the free end 146b of the outer wall 146, the free end of the side wall 147, and the bridge parts 146c.

The first fixing pin 142 is hooked to the hook hole 131 when the nose bridge 130 and the band holder 140 are fixed. The first fixing pin 142 protrudes so that the nose bridge 130 passes through the first fixing pin 142 in the first through hole 141a while the edge of the nose bridge 130 is hooked to the second fixing pin 143. In order to smoothly insert or press the nose bridge 130 into the band holder 140, the first fixing pin 142 has a slope 142a which is inclined at an acute angle with respect to a pressing direction or an inserting direction ID of the nose bridge 130. The slope 142a is formed toward the free end 145b of the inner wall 145 of the first fixing pin 142. Accordingly, a vertical sectional shape of the first fixing pin 142 has a substantially wedged shape or right-angled triangle. The slope 142a of the first fixing pin 142 pushes a portion where the hook hole 131 of the nose bridge 130 is positioned by wedging action when the nose bridge 130 is inserted into the band holder 140. A maximum transverse-sectional shape of the first fixing pin 142 corresponds to a transverse-sectional shape of the hook hole 131, and the transverse-sectional size of the first fixing pin 142 is equal to or smaller than the transverse-sectional size of the hook hole 131. Further, the first fixing pin 142 has a hook surface 142b which is substantially vertical to an opposite side of the slot 142a. The hook surface 142b contacts a hook surface 133 of the hook hole 131.

The second fixing pin 143 is spaced apart from the first fixing pin 142 in an inserting direction to the band holder 140 of the nose bridge 130 or a perpendicular direction to the inserting direction. That is, as illustrated in FIG. 6, the rear end of the second fixing pin 143 is spaced apart from the front end of the first fixing end 142 in the inserting direction ID of the nose bridge 130 or the perpendicular direction to the inserting direction ID (a vertical direction to the front surface 145a of the inner wall 145). Further, the rear end of the second fixing pin 143 is positioned to be closer to the eyecups 110L and 110R than the hook surface 142b of the first fixing pin 142. The front end of the first fixing pin 142 and the rear end of the second fixing pin 143 are substantially spaced apart from each other by a thickness of the nose bridge 130 or a slightly larger thickness than the nose bridge 130. The second fixing pin 143 is hooked to a transverse edge of the nose bridge 130 at the rear end thereof. The second fixing pin 143 protrudes so that the nose bridge 130 is maintained while the first fixing pin 142 is hooked to the hook hole 131 in the first through hole 141a. Further, the second fixing pin 143 has a slope 143a which prevents the nose bridge 130 from being deviated from the through hole 141 by contacting the bent or curved portion (for example, the portion illustrated in reference numeral 230a of FIG. 16) of the nose bridge 130 when the nose bridge 130 is pressed to the band holder 140. As illustrated in FIG. 6, the slope 143a of the second fixing pin 143 is inclined at an obtuse angle in the pressing direction or inserting direction ID of the nose bridge 130. In the embodiment, the second fixing pin 143 has a rectangular cylinder shape having the slope 143a at the inner side. In another embodiment, the second fixing pin 143 has a shape such as a triangular cylinder and a semicircular cylinder having the slope 143a at the inner side. When the nose bridge 130 is fixed to the first through hole 141a, the first fixing pin 142 is inserted or hooked to one of the hook holes 131, and the second fixing pin 143 is hooked to the transverse edge of the nose bridge 130.

Figure 15:
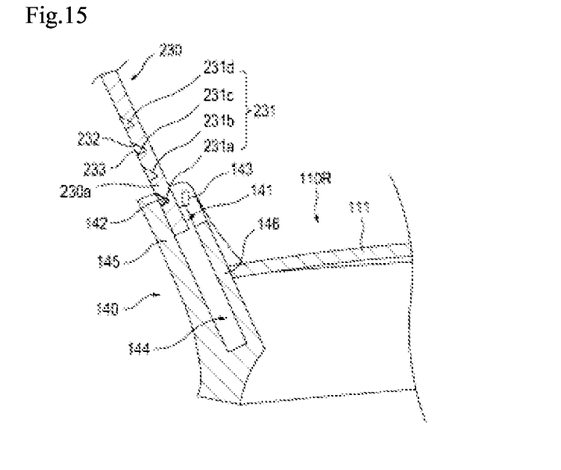
FIG. 15 is a partially cross-sectional view illustrating a state where the nose bridge illustrating in FIG. 13 is fixed to the band holder through one of hook grooves.
Figure 16:
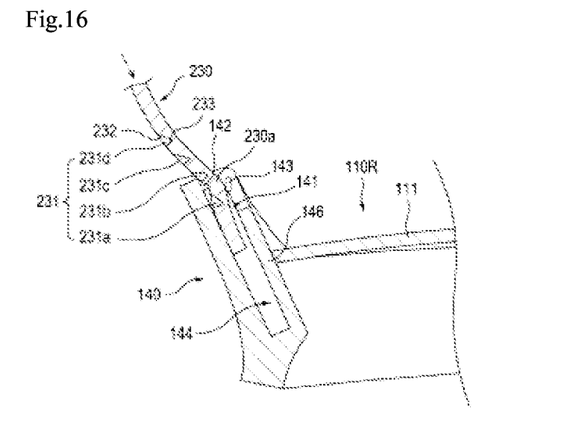
FIG. 16 is a partially cross-sectional view illustrating a state where the nose bridge is pushed with respect to the eyecup in the state illustrated in FIG. 15.
Figure 17:
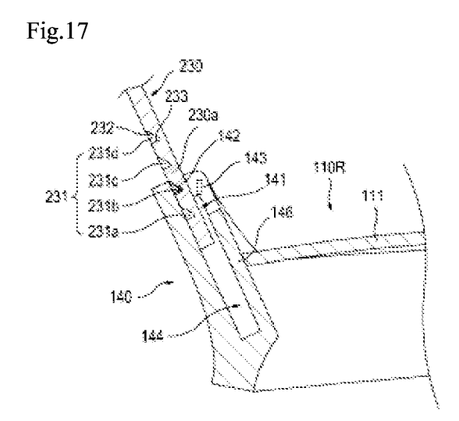
FIG. 17 is a partially cross-sectional view illustrating a state where the nose bridge is fixed to the band holder through the other one of the hook grooves in the state illustrated in FIG. 16.

Referring to FIGS. 7 to 10, an example in which the distance between the eyecups 110L and 110R of the goggles 100 according to the embodiment is adjusted by the nose bridge 130 and the band holder 140. FIGS. 7 to 10 illustrate an example in which the distance between the eyecups 110L and 110R is increased. An example in which the distance between the eyecups 110L and 110R is decreased may be performed as illustrated in FIGS. 15 to 17 to be described below.

Figure 7:
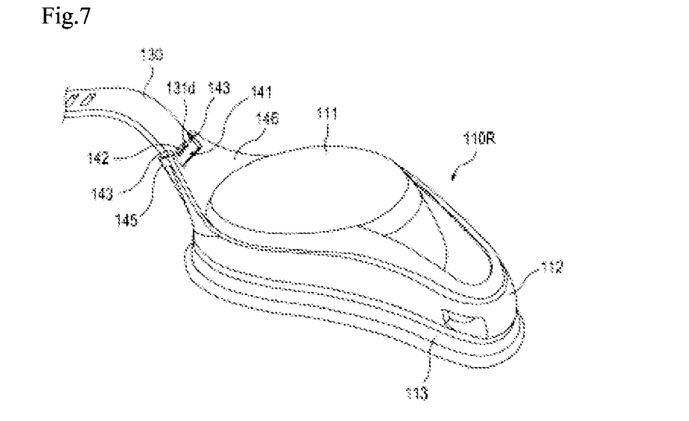
FIG. 7 is a perspective view illustrating a state where the nose bridge is fixed to the band holder through one of hook holes.

In FIG. 7, the nose bridge 130 is fixed to the band holder 140 when the first fixing pin 142 of the band holder 140 is hooked to the hook hole 131d at the innermost side and the transverse edge is hooked by the pair of second fixing pines 143 of the band holder 140. As illustrated in FIG. 7, when the goggle 100 is fixed to a head of the user while the nose bridge 130 is fixed as illustrated in FIG. 7, force applied by the headstrap 120 is applied in the length direction of the nose bridge 130. Therefore, the nose bridge 130 is not separated from the band holder 140 by hooking with the hook surface 133 of the hook hole 131 and the hook surface 142b of the first fixing pin 142.

Figure 8:
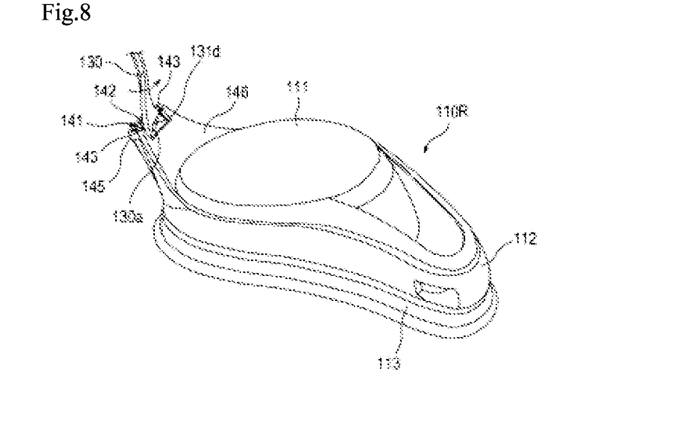
FIG. 8 is a perspective view illustrating a state where the nose bridge is twisted with respect to the eyecup from the state illustrated in FIG. 7.
Figure 9:
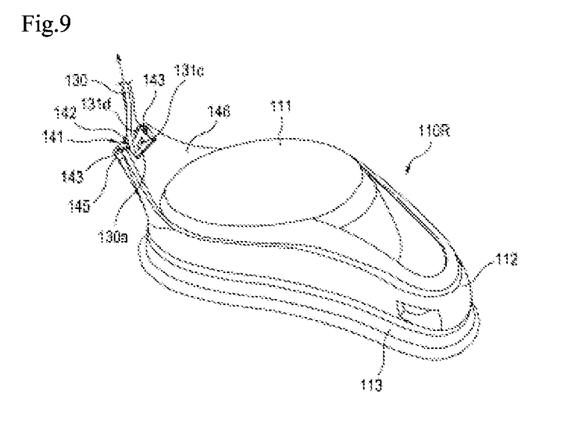
FIG. 9 is a perspective view illustrating a state where the nose bridge is removed from the eyecup by a predetermined length in the state illustrated in FIG. 8.
Figure 10:
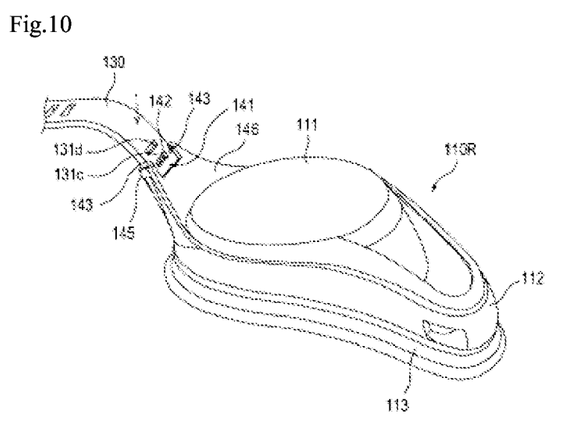
FIG. 10 is a perspective view illustrating a state where the nose bridge is fixed to the band holder through the other one of the hook holes in the state illustrated in FIG. 9.

In order to increase the distance between the eyecups 110L and 110R from the state illustrated in FIG. 7, the first fixing pin 142 of the band holder 140 is inserted or hooked to the hook holes 131b and 131c positioned in the middle of the nose bridge 130 or the hook hole 131a at the outmost side. As illustrated in FIG. 8, the nose bridge 130 is twisted with respect to the eyecup 110R, or the eyecup 110R is twisted with respect to the nose bridge 130. Then, one edge of the nose bridge 130 is deviated from corresponding one of the pair of second fixing pins 143, and the hooking between the hook hole 131d of the nose bridge 130 and the first fixing pin 142 is released. Further, a portion 130a of the nose bridge 130 around the first fixing pine 142 is positioned obliquely throughout the first through hole 141a and the second through hole 141b. Accordingly, the nose bridge 130 may be removed from the band holder 140 through the first through hole 141a and the second through hole 141b. As illustrated in FIG. 9, the nose bridge 130 is removed from the band holder 140 by a predetermined length (for example, by the distance between the hook hole 131*d* and the hook hole 131*c*). Further, the eyecup 110R is retracted from the nose bridge 130 by the predetermined distance. Thereafter, the nose bridge 130 is pressed toward the eyecup 110R or the nose bridge 130 and the eyecup 110R are twisted in reverse, and thus one edge of the nose bridge 130 is hooked to the second fixing pin 143 again, and the first fixing pin 142 is hooked to the hook hole 131*c*. Then, as illustrated in FIG. 10, the nose bridge 130 is fixed to the band holder 140 while the first fixing pin 142 is hooked to the middle hook hole 131*c*. As such, the distance between the eyecups 110L and 110R in the goggles 100 may be adjusted. In FIGS. 7 to 10, the adjustment of the distance between the eyecups through the band holder 140 and the nose bridge 130 provided in the right eyecup 110R is exemplified. The distance between the eyecups may be adjusted even by the band holder 140 and the nose bridge 130 provided in the left eyecup 110L in the same manner.

Figure 11:
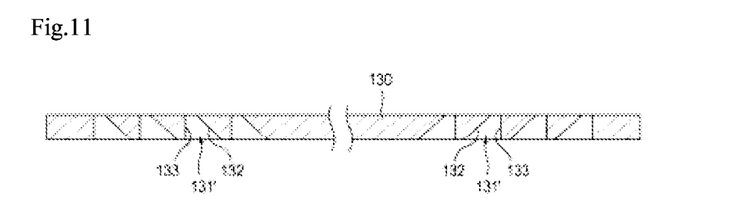
FIG. 11 is a vertically cross-sectional view illustrating another example of the nose bridge.

FIG. 11 illustrates another example of the hook hole of the nose bridge. A hook hole 131' of the nose bridge 130 illustrated in FIG. 11 has a slope 132 corresponding to the slope 142*a* of the first fixing pin 142. The slope 132 of the hook hole 131' is inclined at an acute angle in an inserting direction to the band holder 140 of the nose bridge 130. When the nose bridge 130 is inserted or pressed into the band holder 140, the slope 132 of the hook hole 131' and the slope 142*a* of the first fixing pin 142 partially contact each other.

Figure 12:
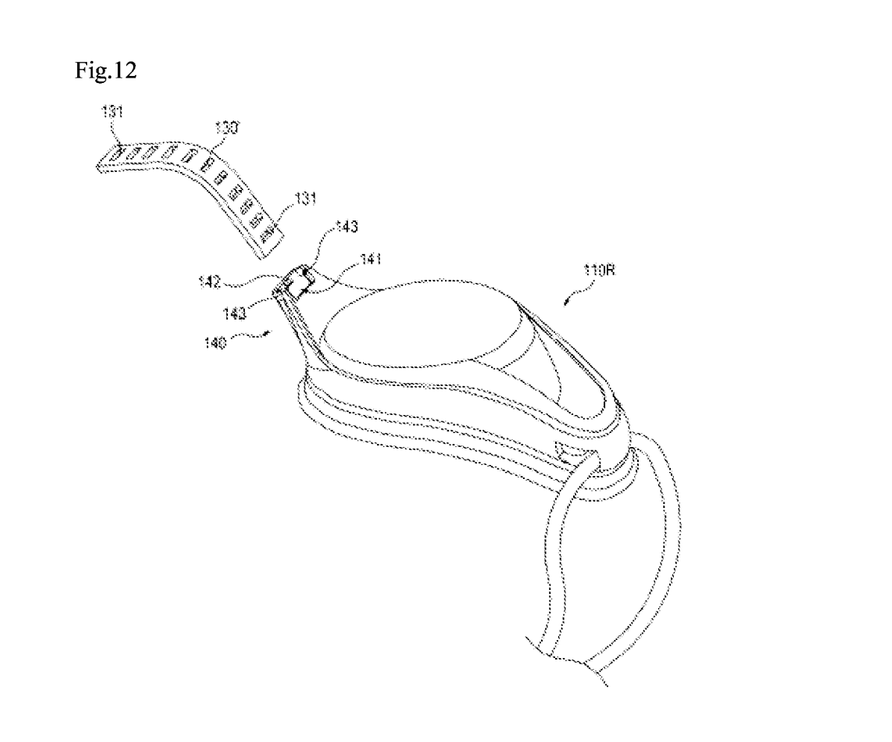
FIG. 12 is a perspective view illustrating yet another example of the nose bridge.

FIG. 12 illustrates another example of the nose bridge. In a nose bridge 130' illustrated in FIG. 12, the hook hole 131 is formed all over the nose bridge 130'. The hook holes 131 of the nose bridge 130' may be arrayed at equal intervals. Further, the distance between the hook holes 131 near the end of the nose bridge 130' may be smaller or larger than the distance between the hook holes 131 at the central portion of the nose bridge 130'.

Figure 13:
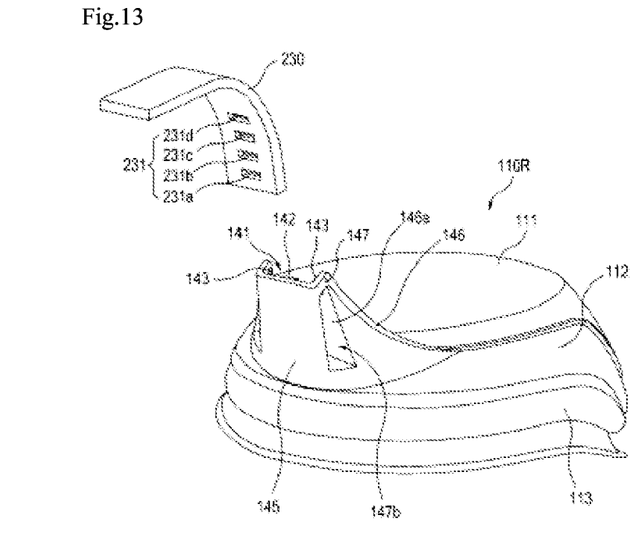
FIG. 13 is a perspective view illustrating a right eyecup and a nose bridge having hook grooves.

FIG. 13 illustrates goggles including a nose bridge according to yet another embodiment. The nose bridge 230 of the goggles 100 according to the embodiment has a plurality of hook grooves 231 which is arrayed at predetermined intervals or equal intervals in a length direction of a nose bridge 230 as the hooking part. The hook groove 231 is formed with a predetermined depth in a thickness direction of the nose bridge 230. In the embodiment, the nose bridge 230 has four hook grooves 231*a*, 231*b*, 231*c*, and 231*d* at one end thereof. The first fixing pin 142 of the band holder 140 is hooked or inserted into the hook groove 231.

Figure 14:
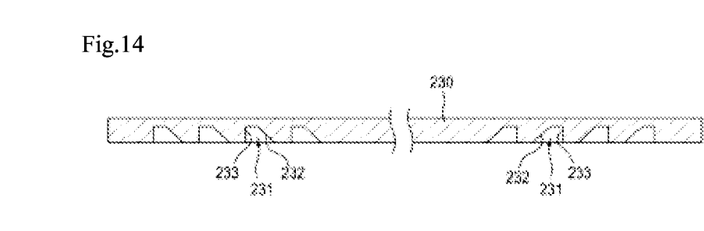
FIG. 14 is a vertically cross-sectional view of the nose bridge illustrated in FIG. 13.

Referring to FIG. 14, the hook groove 231 has a slope 232 contacting the slope 142*a* of the first fixing pin 142. The slope 232 of the hook groove 231 is inclined at an acute angle in an inserting direction to the band holder 140 of the nose bridge 130. When the nose bridge 230 is inserted or pressed into the band holder 140, the slope 232 climbs over the slope 142*a* of the first fixing pin 142. Since the slope 232 of the hook groove 231 and the slope 142*a* of the first fixing pin 142 obliquely contact each other in the inserting direction of the nose bridge 230, the slope 142*a* of the first fixing pin 142 acts as a wedge. Accordingly, when the nose bridge 230 is inserted into the band holder 140, a portion 230*a* (see FIG. 16) of the nose bridge 230 where the hook groove 230 is positioned may easily climb over the first fixing pin 142. Further, an opposite surface of the slope 232 of the hook groove 231 becomes a hook surface 233 which is vertical to the nose bridge 230 to be hooked to the hook surface 142*b* of the first fixing pin 142.

Referring to FIGS. 15 to 17, an example in which the distance between the eyecups 110L and 110R is adjusted by the nose bridge 230 and the band holder 140 will be described. FIGS. 15 to 17 illustrate an example in which the distance between the eyecups 110L and 110R in the goggles 100 according to the embodiment is decreased. An example in which the distance between the eyecups 110L and 110R in the goggles 100 is increased may be performed as illustrated in FIGS. 7 to 10 described above. Further, FIGS. 15 to 17 exemplify the adjustment of the distance between the eyecups by the band holder 140 and the nose bridge 230 provided in the right eyecup 110R. The distance between the eyecups may be adjusted even by the band holder 140 and the nose bridge 230 provided in the left eyecup 110L in the same manner.

In FIG. 15, the nose bridge 230 is fixed to the band holder 140 when the first fixing pin 142 of the band holder 140 is hooked to the hook groove 231*a* at the outermost side and the transverse edge is hooked by the pair of second fixing pines 143 of the band holder 140. As illustrated in FIG. 15, when the goggle 100 is fixed to a user's head while the nose bridge 230 is fixed, force applied by the headstrap 120 is applied in the length direction of the nose bridge 230. Therefore, the nose bridge 230 is not separated from the band holder 140 by hooking with the hook surface 142*b* of the first fixing pin 142 and the hook surface 233 of the hook groove 231.

In order to decrease the distance between the eyecups 110L and 110R from the state illustrated in FIG. 15, the hook grooves 231*b* and 231*c* positioned in the middle of the nose bridge 230 or the hook groove 231*d* at the innermost side are hooked to the first fixing pin 142 of the band holder 140. As illustrated in FIG. 16, the nose bridge 230 is inserted or pressed into the band holder 140. Then, the outermost hook groove 231*a* climbs over the slope 142*a* of the first fixing pin 142. Further, by a wedge action applied by the slope 142*a* of the first fixing pin 142, while the portion 230*a* of the nose bridge 230 where the hook groove 231*a* is positioned is bent or curved above the first fixing pin 142, the nose bridge 230 enters into the band holder 140. Further, in this case, since the edge in the width direction of the nose bridge 230 is hooked to the second fixing pin 143, the portion 230*a* of the nose bridge 230 is not deviated from the band holder 140. When the nose bridge 230 is pressed into the band holder 140 by a predetermined length (for example, by the distance between the hook groove 231*a* and the hook groove 231*b*) in the state illustrated in FIG. 15, or when the eyecup 110R advances toward the nose bridge 230 by the predetermined length, as illustrated in FIG. 16, the hook groove 231*a* passes through the first fixing pin 142 to be positioned at the second through hole 141*b*, and as illustrated in FIG. 17, the hook groove 231*b* is hooked to the first fixing pin 142. As illustrated in FIGS. 15 to 17, while the nose bridge 230 is pressed into the band holder 140, the second fixing pin 143 continuously restrains the transverse edge of the nose bridge 230. As such, the distance between the eyecups 110L and 110R in the goggles 100 may be adjusted.

Figure 18:
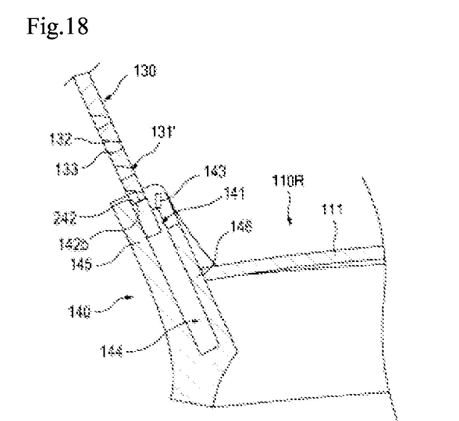
FIG. 18 is a partially cross-sectional view illustrating goggles having a first fixing pin of another example and the nose bridge illustrated in FIG. 11.

FIG. 18 illustrates goggles including a first fixing pin according to another embodiment. In the goggles illustrated in FIG. 18, the nose bridge 130 illustrated in FIG. 11 is adopted, and a first fixing pin 242 does not have a sloe corresponding to a side facing the slope 132 of the hook hole 131' unlike the aforementioned first fixing pin 142. The hooking of the first fixing pin 242 and the hook hole 131' is achieved by hooking between the hook surface 142*b* of the first fixing pin 242 and a hook surface 133 of the hook hole 131'. In order to decrease the distance between the eyecups 110L and 110R, when the nose bridge 130 is inserted into the band holder 140, the slope 132 of the hook hole 131' climbs over the first fixing pin 242. That is, when the nose bridge 130 is inserted into the band holder 140, force which pushes the portion of the nose bridge 130 where the hook hole 131' is positioned is applied between the slope 132 and the front end of the first fixing pin 242 like the aforementioned wedge action, and thus the first fixing pin 242 may be smoothly inserted into the hook hole 131' of the nose bridge 130.

Figure 19:
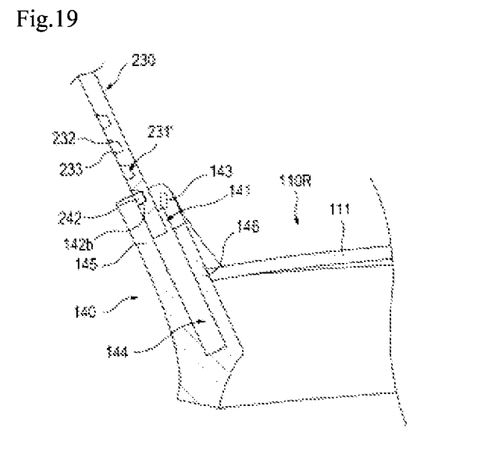
FIG. 19 is a partially cross-sectional view illustrating goggles having a first fixing pin of another example and the nose bridge illustrated in FIG. 14.

FIG. 19 illustrates goggles in which the aforementioned first fixing pin according to another embodiment and the nose bridge 230 illustrated in FIG. 14 are used. In the goggles illustrated in FIG. 19, the first fixing pin 242 is hooked to the hook surface 233 of the hook groove 231 on the hook surface 142b. When the nose bridge 230 is inserted into the band holder 140, the slope 232 of the hook groove 231 climbs over the first fixing pin 242 and thus the distance between the eyecups 110L and 110R may be decreased.

In the aforementioned embodiment, the band holders 140 are disposed at inner ends of the frame parts 112, respectively. In another embodiment, one band holder 140 is positioned only at the inner end of one frame part 112, and the other end of the nose bridges 130, 130', and 230 may be attached or fastened to the inner end of the other frame part 112.

Further, in the aforementioned embodiment, the band holder 140 is obliquely extended forward from the frame part 112. In another embodiment, the band holder 140 may be extended in parallel to the frame part 112.

Further, in the aforementioned embodiment, the free end 146b of the outer wall 146 of the band holder 140 is positioned to be closer to the eyecups 110L and 110R than the free end 145b of the inner wall 145. In another embodiment, the free end 145b of the inner wall 145 may be positioned to be closer to the eyecup than the free end 146b of the outer wall 146. In the embodiment, the first fixing pin 142 is positioned at the free end of the outer wall.

Further, in the aforementioned embodiment, the nose bridges 130, 130', and 230 include a plurality of hook holes 131 and 131' or a plurality of hook grooves 231. In another embodiment, the nose bridge may include the plurality of hook holes at one end, and the plurality of hook grooves at the other end.

Further, in the aforementioned embodiment, the pair of eyecups 110L and 110R are connected to each other by one of the nose bridges 130, 130', and 230. In another embodiment, the goggles may be provided together with the plurality of nose bridges 130, 130', and 230 having different lengths. In the embodiment, the nose bridge may have one or more hook holes 131 and 131' or the hook groove 232 at both ends of the nose bridge.

Although the present invention described as above is not limited by the aforementioned embodiments and the accompanying drawings and it will be apparent to those skilled in the art that various substitutions, modifications, and changes can be made within the scope without departing from the technical spirit of the present invention.

The invention claimed is:

1. Goggles, comprising:
a pair of eyecups having a lens part;
a nose bridge including a plurality of hooking parts arrayed in a length direction at one or more ends and for connecting facing ends of the eyecups; and
a band holder extended from at least one of the facing ends of the eyecups and for accommodating and fixing one end of the nose bridge, wherein
the band holder includes a through hole formed at a free end such that one end of the nose bridge passes through the through hole, a first fixing pin positioned in the through hole and hooked to the hooking part of the nose bridge, and a pair of second fixing pins positioned in the through hole with the first fixing pin therebetween and hooked to a transverse edge of the nose bridge,
the first fixing pin has a slope which is inclined in an inserting direction to the band holder of the nose bridge and a hook surface hooked to the hooking part at an opposite side of the slope, and
a front end of the first fixing pin and a rear end of the second fixing pin are spaced apart from each other in the inserting direction and a perpendicular direction to the inserting direction.

2. The goggles of claim 1, wherein the second fixing pin has a slope which is inclined at an obtuse angle in the inserting direction.

3. The goggles of claim 1, wherein the hooking part of the nose bridge includes hook holes passing through the nose bridge.

4. The goggles of claim 3, wherein the hook hole has a slope which is inclined in the inserting direction to the band holder of the nose bridge at a side contacting the first fixing pin and a hook surface hooked to the first fixing pin at an opposite side of the slope.

5. The goggles of claim 1, wherein the hooking part of the nose bridge includes hook grooves.

6. The goggles of claim 5, wherein the hook groove has a slope which is inclined in the inserting direction to the band holder of the nose bridge at a side contacting the first fixing pin and a hook surface hooked to the first fixing pin at an opposite side of the slope.

7. The goggles of claim 1, wherein the band holder has an inner wall and an outer wall which are extended from at least one of facing ends of the eyecups and face each other and a pair of side walls which is extended between the inner wall and the outer wall, the through holes are formed in a free end of the inner wall and a free end of the outer wall, the first fixing pin is positioned at the free end of one of the inner wall and the outer wall, and the second fixing pin is positioned at the side wall.

8. The goggles of claim 1, wherein the nose bridge does not protrude toward a face of a user when worn by the user.

9. The goggles of claim 1, wherein the band holder is placed between the nose bridge and at least one of the eyecups.

10. The goggles of claim 1, wherein the band holder directly contacts the nose bridge.

* * * * *